United States Patent
Miller et al.

(10) Patent No.: US 9,191,537 B2
(45) Date of Patent: Nov. 17, 2015

(54) SYSTEMS AND METHODS FOR ENHANCED OBJECT DETECTION

(71) Applicant: Blink Technologies, Inc., Lexington, KY (US)

(72) Inventors: Mark Miller, Lexington, KY (US); Anthony Michael King, Lexington, KY (US); Roger S. Cannon, Nicholasville, KY (US)

(73) Assignee: Blink Technologies, Inc., Nicholasville, KY (US)

( * ) Notice: Subject to any disclaimer, the term of this patent is extended or adjusted under 35 U.S.C. 154(b) by 0 days.

(21) Appl. No.: 14/553,468

(22) Filed: Nov. 25, 2014

(65) Prior Publication Data
US 2015/0146267 A1    May 28, 2015

Related U.S. Application Data

(63) Continuation of application No. PCT/US2014/067054, filed on Nov. 24, 2014.

(60) Provisional application No. 61/908,718, filed on Nov. 25, 2013.

(51) Int. Cl.
| | |
|---|---|
| H04N 1/04 | (2006.01) |
| H04N 1/409 | (2006.01) |
| H04N 1/387 | (2006.01) |
| G06T 5/50 | (2006.01) |
| G06T 7/00 | (2006.01) |
| H04N 1/00 | (2006.01) |
| H04N 1/40 | (2006.01) |
| H04N 1/028 | (2006.01) |

(52) U.S. Cl.
CPC .............. *H04N 1/00816* (2013.01); *G06T 5/50* (2013.01); *G06T 7/004* (2013.01); *G06T 7/0022* (2013.01); *H04N 1/00702* (2013.01); *H04N 1/00718* (2013.01); *H04N 1/00721* (2013.01); *H04N 1/00737* (2013.01); *H04N 1/00748* (2013.01); *H04N 1/00801* (2013.01); *H04N 1/00809* (2013.01); *H04N 1/02815* (2013.01); *H04N 1/3872* (2013.01); *H04N 1/3876* (2013.01); *H04N 1/3878* (2013.01); *H04N 1/40056* (2013.01); *H04N 1/4097* (2013.01); *G06T 7/0085* (2013.01)

(58) Field of Classification Search
None
See application file for complete search history.

(56) References Cited

U.S. PATENT DOCUMENTS

| | | | |
|---|---|---|---|
| 5,134,666 | A | 7/1992 | Imao et al. |
| 5,390,029 | A | 2/1995 | Williams et al. |
| 5,693,933 | A | 12/1997 | Takasu et al. |
| 5,719,958 | A | 2/1998 | Wober et al. |
| 6,198,088 | B1 | 3/2001 | Seachman |
| 6,608,707 | B1 | 8/2003 | Han |

(Continued)

*Primary Examiner* — Scott A Rogers
(74) *Attorney, Agent, or Firm* — Dinsmore & Shohl LLP (57) ABSTRACT

Systems and methods for enhanced object detection are provided in this disclosure. One embodiment of a method includes providing front side illumination of an object, capturing a first image of the object, and providing backside illumination of the object. Some embodiments include capturing a second image of the object, and determining an edge of the platform area assembly. Similarly, some embodiments include aligning the object from the second image with the edge of the platform area assembly to determine a location of the object, determining based on the location of the object, a pixel in the first image that does not belong to the object, and modify the pixel from the first image that does not belong to the object to create an altered image.

20 Claims, 7 Drawing Sheets

(56) References Cited

U.S. PATENT DOCUMENTS

| | | |
|---|---|---|
| 6,930,809 B1 | 8/2005 | Kagawa et al. |
| 7,006,260 B2 | 2/2006 | Sato et al. |
| 7,072,527 B1 * | 7/2006 | Nako .......................... 382/290 |
| 7,548,356 B2 | 6/2009 | Han et al. |
| 7,648,138 B2 | 1/2010 | Hayashi et al. |
| 7,653,264 B2 | 1/2010 | Hero et al. |
| 7,684,916 B2 | 3/2010 | Wei et al. |
| 8,035,865 B2 | 10/2011 | Ishido et al. |
| 8,253,990 B2 | 8/2012 | King et al. |
| 2012/0274838 A1 * | 11/2012 | Teggatz et al. ................ 348/371 |

* cited by examiner

SYSTEMS AND METHODS FOR ENHANCED OBJECT DETECTION

CROSS REFERENCE

This application is a continuation of PCT Application Serial Number PCT/US14/67054, filed Nov. 24, 2014, which claims the benefit of U.S. Provisional Application No. 61/908,718, entitled Enhanced Edge Detection Using a Camera Based Scanner filed Nov. 25, 2013, which are hereby incorporated by reference in their entireties.

TECHNICAL FIELD

The disclosure relates generally to enhanced object detection, and, more particularly, to a camera based scanning device used for object scanning.

BACKGROUND

Image scanning devices, such as scanners, are currently used for scanning information on objects such as sheets of paper, transparencies, picture negatives, three dimensional objects, and the like. Scanning the information provided on an object, such as a media sheet or three dimensional object includes converting the image information of the object into a digital image.

These image scanning devices may include a platen, a scan bar with a light source, and a lid with a backer material for scanning media sheets or objects. The object is placed on the platen such that a side of the object including the information to be scanned faces the platen. The lid with a backer material that is often white presses the object flat or holds the object stationary, when it is closed.

When scanning on these conventional devices, the lid of the scanner is closed and outputs a digital image that contains the image of the objects being scanned plus a full image of the white backer material. While the object may be adequately scanned, the white backer material may be difficult to remove from the scanned image. This can be difficult because, depending on the particular object and/or scan, the white backer material can be very close to the same color as the primary portions of the scan. Accordingly, a need in the industry exists.

SUMMARY

Systems and methods for enhanced object detection are described. One embodiment of a method includes providing front side illumination of an object, capturing a first image of the object, and providing backside illumination of the object. Some embodiments include capturing a second image of the object, and determining an edge of the platform area assembly. Similarly, some embodiments include aligning the object from the second image with the edge of the platform area assembly to determine a location of the object, determining based on the location of the object, a pixel in the first image that does not belong to the object, and modifying the pixel from the first image that does not belong to the object to create an altered image.

In another embodiment, a system includes a platform area assembly that includes a surface for supporting an object on a front side for scanning, a light source assembly coupled to the platform area assembly, the light source assembly illuminating the front side of the platform area assembly and the object residing on the platform area assembly, and an image capture device coupled to the light source assembly, the image capture device capturing imagery of the object on the platform area assembly. Some embodiments include a backlight assembly that is coupled to a backside of the platform area assembly, the backlight assembly for illuminating the object through the platform area assembly and a computing device coupled to the image capture device, wherein the computing device comprises logic that, when executed by a processor, causes the processor to activate the light source assembly to illuminate the object and the platform area assembly, activate the image capture device to capture a first image of the object and at least a portion of the platform area assembly with the light source assembly activated, and activate the backlight assembly to illumination the object and the platform area assembly from the backside of the platform area assembly. Some embodiment may cause the system to activate the image capture device to capture a second image of the object and at least a portion the platform area assembly with the backlight assembly activated, compare the first image and the second image to determine a regional property of the object in the first image, and remove the captured imagery of the platform area assembly from the first image.

In yet another embodiment, a computing device includes a processor that executes instructions and a memory component that is coupled to the processor that stores logic that, when executed by the processor, causes the computing device to activate a light source assembly of an imaging assembly to illuminate an object and a platform area assembly of the imaging assembly. The imaging assembly may include an image capture device that captures a first image and a second image of the object and at least a portion of the platform area assembly. The imaging assembly may also include a light source assembly may provide front side illumination of the object and the platform area assembly. The platform area assembly may be at least partially translucent. A backlight assembly may provide back side illumination of the object and the platform area assembly. The logic may additionally cause the computing device to activate the image capture device to capture the first image of the object and at least a portion of the platform area assembly with the light source assembly activated and the backlight assembly deactivated, activate the backlight assembly to illumination the object and the platform area assembly from the backside of the platform area assembly, and deactivate the light source assembly. The logic may further cause the computing device to activate the image capture device to capture the second image of the object and at least a portion the platform area assembly with the backlight assembly activated and the light source assembly deactivated, analyze the second image to determine regional property of the object in the first image, and modify imagery of the platform area assembly from the first image, based on the analysis of the second image.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for enhanced object detection. Specifically, some embodiments provide an image capture assembly for capturing an image of an object. The image capture assembly may include an area sensor, focusing lens, an image capturing device, and at least one illumination source. The illumination source may include a light emitting diode (LED) arrangement incandescent light, etc. on an image capture device side of the object in place of the scan bar illumination arrangement. In some embodiments, the illumination source may be ambient light. Regardless of the type, this is referred to as front side illumination. Embodiments may also include a platform area arrangement that may operate as a platen and backer pad arrangement. Additionally, embodiments may include an illumination arrangement to the platform area. Illumination using the platform area is referred to as backside illumination.

Similarly, in embodiments with a lens and sensor arrangement, the lens and sensor arrangement may be configured to focus light from the platform area arrangement onto the sensor arrangement. Objects on the platform area arrangement may be illuminated using a first light source on the sensor side of the object. A front side illumination may also be provided to capture object details such as color, content, and surfaces. Objects on the platform area arrangement may also be illuminated from behind the objects being captured (backside illumination). The image captured using back side illumination contains the details about the edges (and/or other regional properties) of objects, the transparency of the object and the position of the object relative to the imaging platform. Embodiments that use the back side illuminated information to extract the image of an object(s), align the object image with the edges of the platform, remove or otherwise modify any pixels that do not belong to the object, and adjust the transparency of object pixels that have transparent characteristics.

Embodiments described herein provide an image capture device, such as a camera directed and focused on the platform area arrangement, an area sensor to digitize the image, a light source to illuminate the object from the image capture side, a platform area surface for placing objects, and a light source under the platform area arrangement to illuminate the object from behind. The image capture device may include a CMOS or CCD area sensor arrangement to digitize the image and a lens arrangement to focus the image from the surface of the platform area to the surface of the area sensor. The light source on the image capture side of the platform area arrangement may provide front side illumination of objects. This illumination may be used to digitize detailed object information such as colors, content, and surfaces. Below the platform area is second light source that is used to illuminate objects from the backside of the platform area. This embodiment may digitize a silhouette image of the objects on the platform area surface and to capture the transmittance characteristics of an object. An illumination arrangement is incorporated into the platform area assembly 103 and is referred to as backside illumination.

Figure 1:
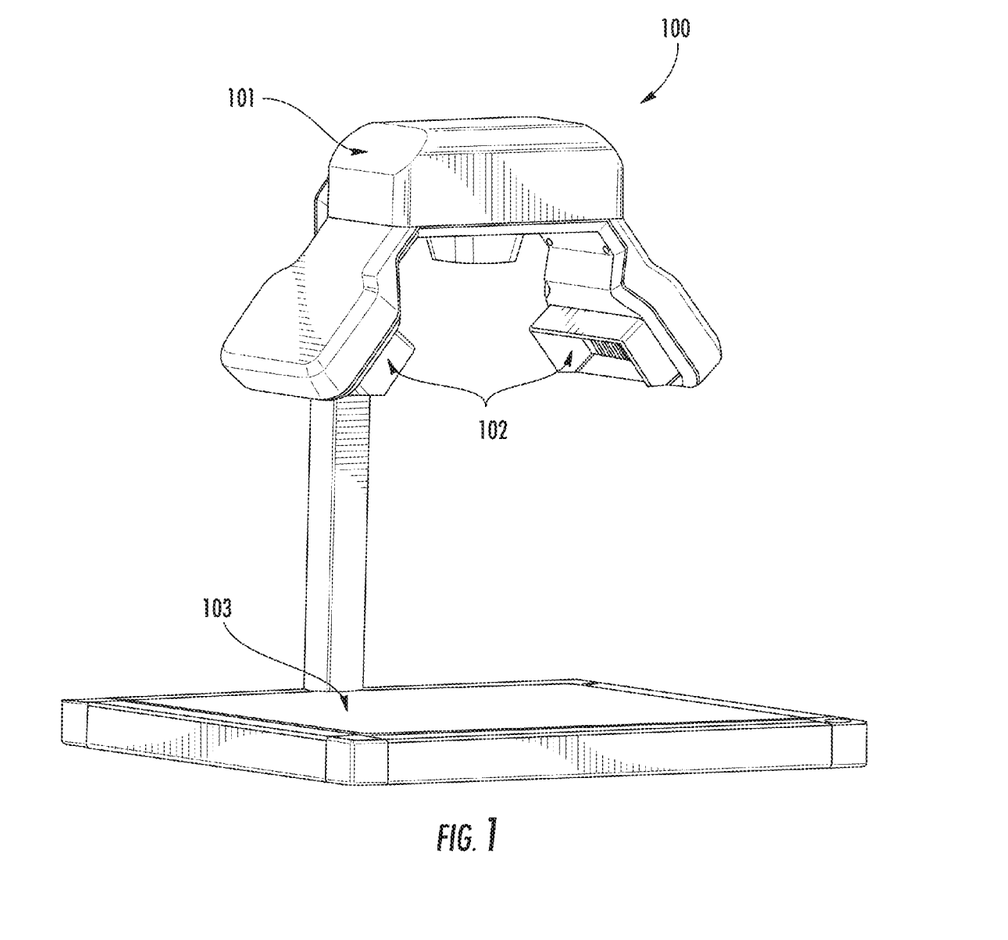
FIG. 1 depicts an isometric view of an imaging assembly, according to embodiments disclosed herein.

Referring now to the drawings, FIG. 1 depicts an isometric view of an imaging assembly 100, according to embodiments disclosed herein. As illustrated, the imaging assembly 100 includes an imaging enclosure 101, an illumination source 102 (at least one), and a platform area assembly 103. The embodiment of FIG. 1 provides front side illumination with an illumination source 102 on the imaging enclosure side of the platform area assembly 103. The illumination source 102 provides a substantially uniform light distribution onto the platform area assembly 103. The imaging enclosure 101 is positioned such that light reflected from the platform area assembly 103 and object(s) placed on the platform area assembly 103 can be captured and digitized within the imaging enclosure 101 (which may include a local computing device 105 that is an integrated component of the imaging assembly 100 and/or at least a portion of the processing may be provided by a remote computing device). While in some embodiments, the platform area assembly 103 may be configured to receive objects about 8.5"×11.7" along the plane of the platform area, this is merely an example, as other sizes are also included within the scope of this disclosure. Also included is a backlight assembly 132, which may provide additional lighting to provide the functionality described in more detail in FIG. 5.

Figure 2:
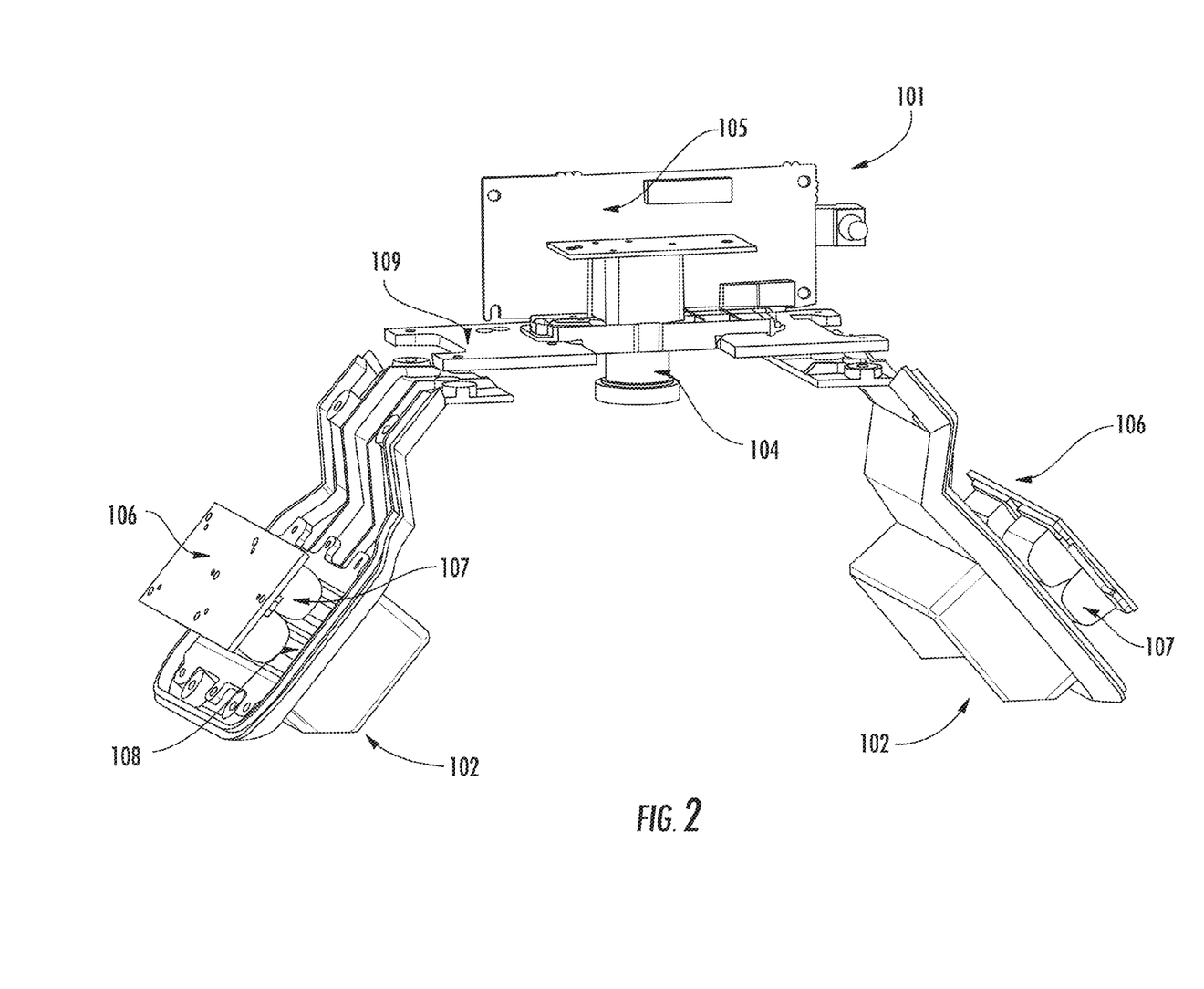
FIG. 2 depicts a sectioned view of the imaging enclosure, according to embodiments disclosed herein.

FIG. 2 depicts a sectioned view of the imaging enclosure 101, according to embodiments disclosed herein. Components within the enclosure may include the image capture device 104, the local computing device 105, an light source assembly 106 (one or more), a primary optic 107, a secondary optic 108, and a mounting frame 109. The image capture device 104 may be configured to capture and utilize the local computing device 105 (and/or the remote computing device) to digitize an image of an object on the platform area assembly 103. The light source assembly 106 provides an illumination source 102 (at least one), such as an incandescent light, an LED, etc. used to illuminate the platform area assembly 103. Also included is a primary optic 107 that is configured to focus and collimate the light from the light source assembly 106 onto the platform area assembly 103. A secondary optic 108 is also included and is configured to operate in concert with the primary optic 107 to substantially uniformly distribute the light over the platform area assembly 103.

It should be understood that the illumination source 102 is not limited to the two light sources depicted in FIGS. 1 and 2. Depending on the particular embodiment, a single light source or plurality of light sources may be utilized to obtain a desired level of illumination. Similarly, ambient light may be utilized as a light source with or without the structure of the illumination source 102 depicted in the drawings. The mounting frame 109 may be configured to maintain mechanical positioning and stability for the image capture device 104 and the light source assembly 106.

It should be understood that in some embodiments, the local computing device 105 may be utilized to process image data and other data as described herein. Similarly, some embodiments may be configured for the imaging assembly 100 to communicate with a remote computing device for performing the functionality described herein. Accordingly, while not explicitly depicted in FIGS. 1 and 2, the local computing device 105 and/or the remote computing device may include a memory component, a processor, input/output hardware, network interface hardware, a data storage component for storing data, display device, printer, etc. Embodiments that are configured to communicate with the remote computing device may include hardware and/or software in the imaging assembly 100 for facilitating communication of this data, as well as performing other functionality for capturing the image data.

The processor may include a digital signal processor (DSP), an advanced, reduced instruction set machine (ARM) processor, and/or other processor which are programmed to control the image capture device 104 and light source assembly 106. Additionally, the memory component may be configured as volatile and/or nonvolatile memory and as such, may include random access memory (including SRAM, DRAM, and/or other types of RAM), flash memory, secure digital (SD) memory, registers, compact discs (CD), digital versatile discs (DVD) (whether local or cloud-based), and/or other types of non-transitory computer-readable mediums. The memory component may store operating logic and the other logic components described herein. The logic components may include a plurality of different pieces of logic, each of which may be embodied as a computer program, firmware, and/or hardware, as an example. A local interface may also be included and may be implemented as a bus or other communication interface to facilitate communication among the components of the local computing device 105 (and/or a remote computing device).

The processor may include any processing component operable to receive and execute instructions (such as from a data storage component and/or the memory component). As will be understood, the input/output hardware may include and/or be configured to interface with the components of FIGS. 1 and 2. The network interface hardware may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between or among the imaging assembly 100 and other computing devices. The operating logic may include an operating system and/or other software for managing components of the local computing device 105 and/or the remote computing device.

Figure 3:
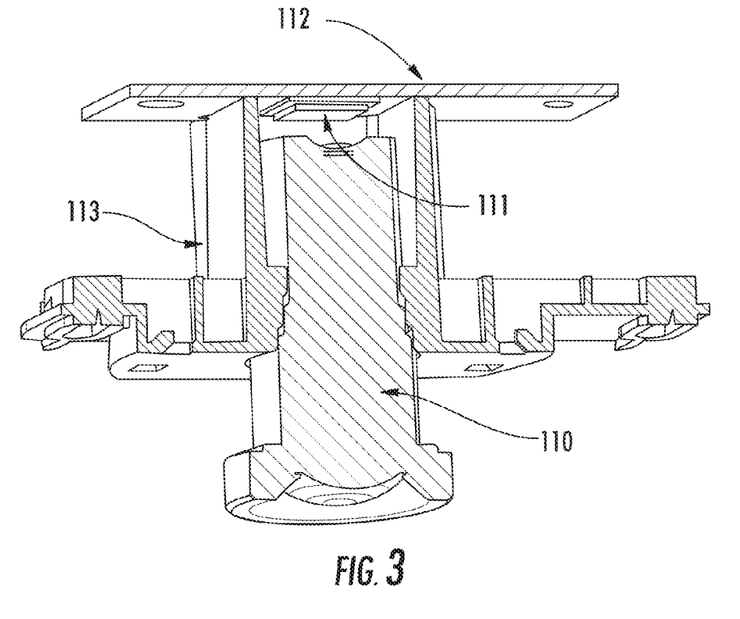
FIG. 3 depicts a sectioned view of the image capture device, according to embodiments disclosed herein.

FIG. 3 depicts a sectioned view of the image capture device 104, according to embodiments disclosed herein. The components within the image capture device 104 include a focusing lens assembly 110, a housing 113, an area sensor 111 and a circuit board 112. Depending on the particular embodiment, the focusing lens assembly 110, the housing 113, and the area sensor 111 may be constructed on top of the circuit board 112. Such an embodiment may utilize the area sensor 111 (which may be a monochrome sensor in some embodiments) and the focusing lens assembly 110 to focus light reflected from the object and the platform area assembly 103 onto the area sensor 111. The area sensor 111 may be configured to utilize a complementary metal-oxide-semiconductor (CMOS) or charge coupled device (CCD) sensor that has an X-Y grid pattern of sensing pixels which determine the resolution of the image. The area sensor 111 may be utilized to digitize the light intensity and provide a high resolution digital image that represents a two dimensional image of the object and the platform area assembly 103.

The area sensor 111 used in this implementation is a monochrome CMOS sensor. However, embodiments that utilize a camera arrangement are not limited to the area sensor 111. As an example, a color area sensor incorporating a color filter array such as a Bayer pattern could be used to capture front side illuminated images.

Figure 4:
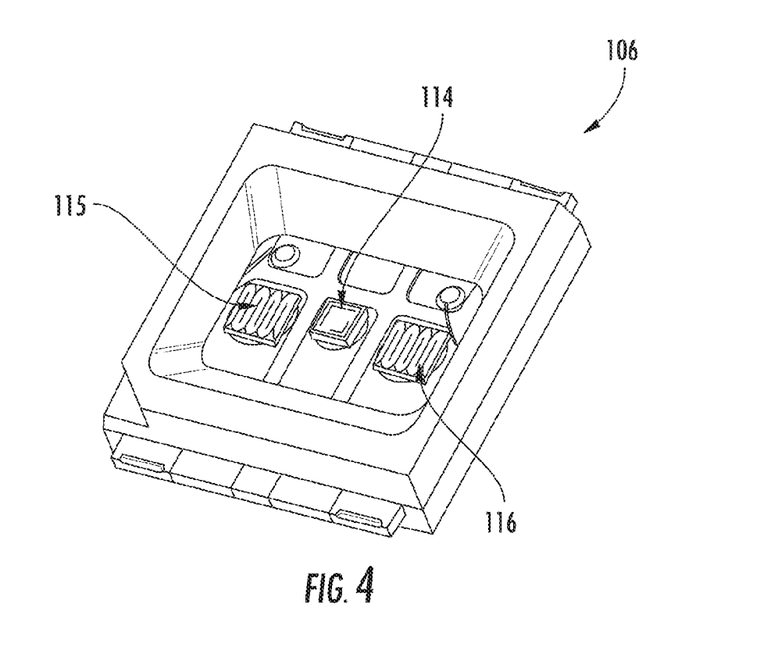
FIG. 4 depicts a detailed view of the construction of the light source assembly, according to embodiments disclosed herein.

FIG. 4 depicts a detailed view of the construction of the light source assembly 106, according to embodiments disclosed herein. The light source assembly 106 may include three dies 114, 115, 116. Specifically, the light source assembly 106 may include a red die 114 (a first die) that has a dominant wavelength (or red spectrum) of about 620 nanometers to about 630 nanometers. A green die 115 (a second die) may also be included and may have a dominant wavelength (or green spectrum) of about 520 nanometers to about 535 nanometers. A blue die 116 (a third die) may also be included and may have with a dominant wavelength (or blue spectrum) of about 460 nanometers to about 475 nanometers. The illumination arrangement may include a the primary optic 107 (FIG. 1), the secondary optic 108 (FIG. 1), and the light source assembly 106 to provide a controlled and near uniform light distribution over the platform area.

In the depicted embodiment of FIG. 4, the light source assembly 106 on the right side illuminates the left portion of the platform area assembly 103. Similarly, the light source assembly 106 on the left side illuminates the right portion of the platform area assembly 103. The local computing device 105 may programmed to capture the illuminated portion of the image and sequence through a plurality of sides and a plurality of wavelengths resulting in a plurality of digital captures (in some embodiments six digital captures). The local computing device 105 processes the digital captures and combines the digital captures into a first image that includes a red, green, and/or blue color plane. The first image contains the object detail information for one or more objects on the platform area assembly 103 as well as detailed information of any exposed surface of the platform area assembly 103.

It should be understood that the embodiments described herein are not limited to the wavelengths described above. Other wavelengths may be used such as infrared, ultra-violet and amber.

Figure 5:
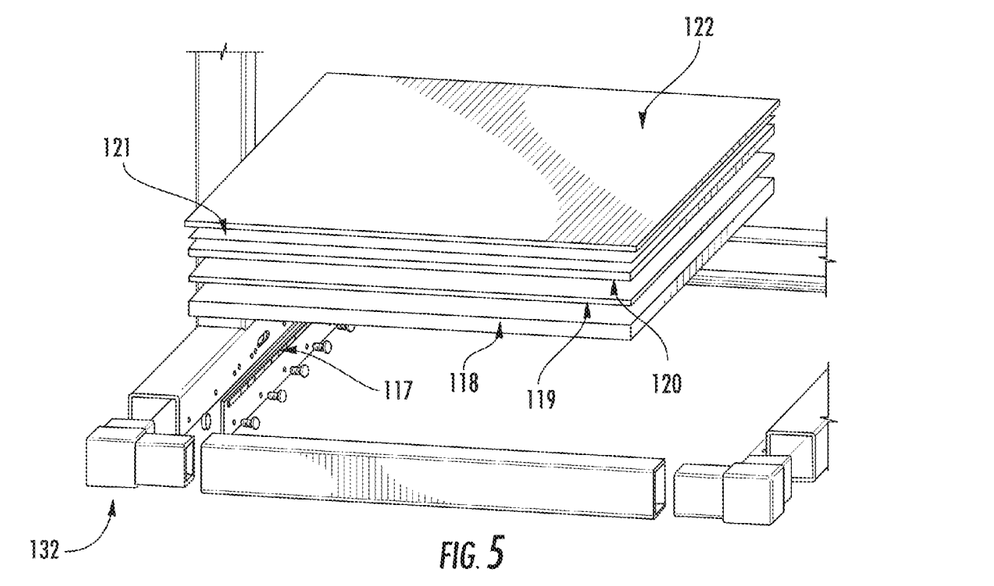
FIG. 5 depicts an exploded view of the backlight assembly and platform, according to embodiments disclosed herein.

FIG. 5 depicts an exploded view of the backlight assembly 132 and the platform area assembly 103, according to embodiments disclosed herein. As illustrated, FIG. 5 includes a backlight computing device 117, a support plate 118, a mirrored plate 119, a light guide 120, an enhancement film 121, and a diffuser plate 122. The backlight computing device 117 provides illumination with an array of backlight sources, such as LEDs, incandescent lights, etc. The backlight sources may be optically coupled to one or more edges of the light guide 120. A white LED with a broad spectrum of light from about 400 nanometers to about 750 nanometers may be utilized, but is not a requirement. Illumination using spectrums such as Infrared, deep infrared, ultraviolet, red, green, blue, or any combination thereof, would produce a result that could be used for a similar purpose. The backlight computing device 117 may be positioned to align the backlight sources with an edge of the light guide 120. The light guide 120 may be configured to substantially uniformly distribute light over the platform area assembly 103, which is at least partially translucent to transmit light from the backlight assembly 132 to the image capture device 104. This may be accomplished using a two dimensional and/or three dimensional pattern on the surface of the light guide 120. The pattern redirects reflected light toward the platform area assembly 103 surface. An enhancement film 121 may be placed on the surface of the light guide 120 to improve the efficiency of the light redirection. The mirrored plate 119 may include a specular reflection surface that aids in recovering stray light from the light guide 120 and improves the efficiency of the light guide 120. The diffuser plate 122 may function as a filter to improve the uniformity of the illuminated area and also provides the surface of the platform area assembly 103.

It should be understood that the shape of the light guide 120 can be substantially flat as shown in FIG. 5 or another shape, such as a wedge shape. It should also be understood that the pattern used to deflect light could also have multiple arrangements to provide similar results. This includes different silkscreened, etched, and/or molded patterns. It should also be understood that the arrangement of light sources from alternate or a plurality of sides could also provide proper illumination.

Additionally, one will understand that the backlight computing device 117 may include a circuit board and/or other hardware for performing the functionality described above. Similarly, some embodiments may be configured such that the backlight computing device 117 is coupled to and/or part of the local computing device 105 (and/or remote computing device) described above.

Figure 6:
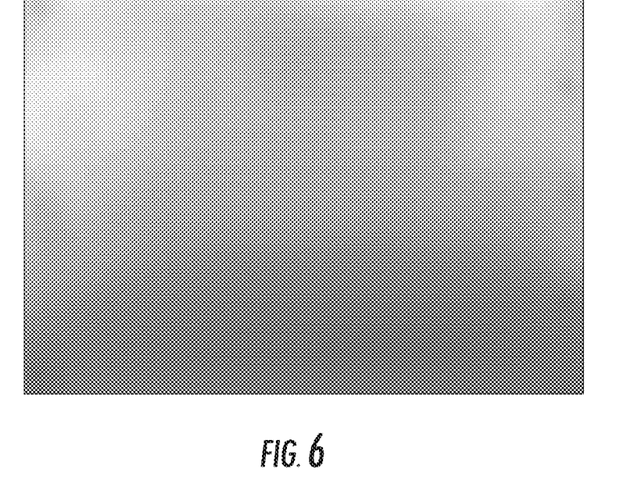
FIG. 6 depicts an image captured by the backlight assembly with no objects on the platform area assembly, according to embodiments disclosed herein.

FIG. 6 depicts an image captured by the backlight assembly 132 (FIGS. 1 and 5) with no objects on the platform area assembly 103, according to embodiments disclosed herein. As illustrated, the image of the platform area assembly 103 with the backlight assembly 132 activated, front side illumination deactivated, and no object present on the platform area assembly 103. The local computing device 105 may be programmed to deactivate the front side illumination and to activate the backside illumination. The area sensor 111 (FIG. 3) may be configured to capture an image of the enough of the platform area assembly 103. In some embodiments, the image capture device 104 may include a color area sensor incorporating a color filter array such as a Bayer pattern could also be used to capture the backlight image.

It should be understood that while embodiments described herein include a backlight assembly 132, this is merely an example. Specifically, in some embodiments the light source assembly 106 (and/or other light sources, such as ambient light) may be utilized with a reflective surface in the platform area assembly 103 to provide the backlight functionality effect. Similarly, some embodiments may include a backlight assembly 132 with another image capture device to capture images of the image for three dimensional scans, etc.

Figure 7:
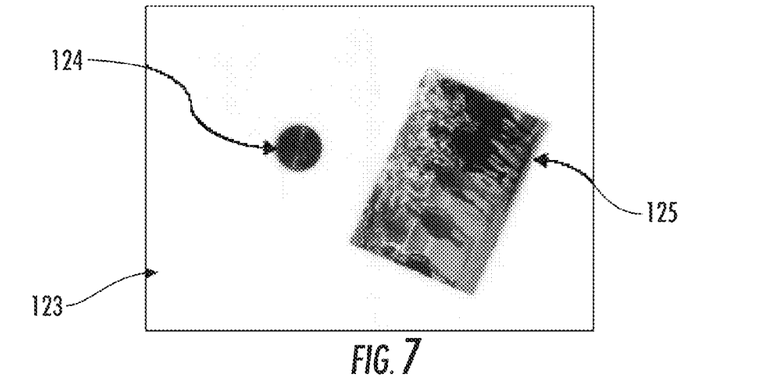
FIG. 7 depicts an image captured of objects using front side illumination, according to embodiments disclosed herein.

FIG. 7 depicts an image captured of objects using front side illumination, according to embodiments disclosed herein. Front side illumination may be utilized to digitize detailed object information such as colors, content, and surfaces. The image depicted in FIG. 7 depicts two objects 124,125 on the platform area assembly 103.

Figure 8:
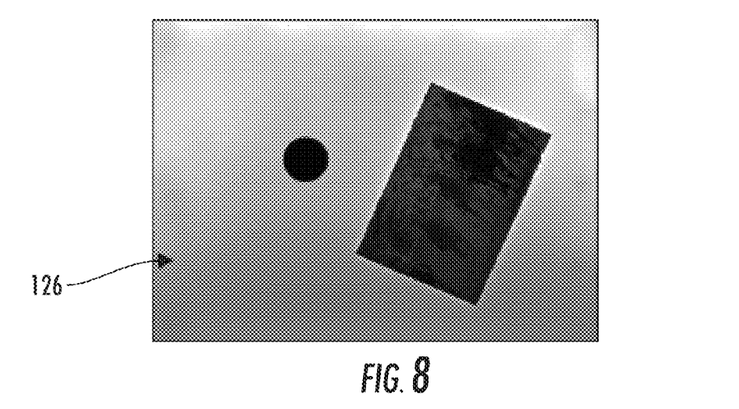
FIG. 8 depicts an image captured of objects using back side illumination, according to embodiments disclosed herein.

FIG. 8 depicts a second image captured of objects using back side illumination, according to embodiments disclosed herein. The same two objects 124,125 from FIG. 7 are visible in the image of FIG. 8. Objects present when the backside illumination is activated may impede the light that reaches the area sensor 111. Exposed areas of the platform area assembly 103 may appear near white and objects on the platform area assembly 103 may impede the light, resulting in a near black silhouette of the object. The digitized image contains the regional properties, such as edge information and/or perimeter information of an object(s) and measures the amount of light that passes through the object(s) itself. Accordingly, an analysis of the second image may be performed to determine regional property of the object, such as a perimeter of the object. The intensity information of the light passing through an object(s) can then be used to apply transmittance characteristics to the image of the object.

In the front side illuminated image 123 (the first image), it may be desirable to separate objects 124,125 from the platform area surface. The back side illuminated image 126 (the second image) contains sufficient contrast and can reliably be processed using edge detection algorithm that includes regional properties such as minimum area enclosing rectangle, and/or minimum perimeter enclosing rectangle, in addition to edge detection. Some examples include using a Sobel operator, Prewitt operator, Canny, etc. The derived edge information may be used to create a mask that outlines the objects placed on the platform area assembly 103.

Figure 9:
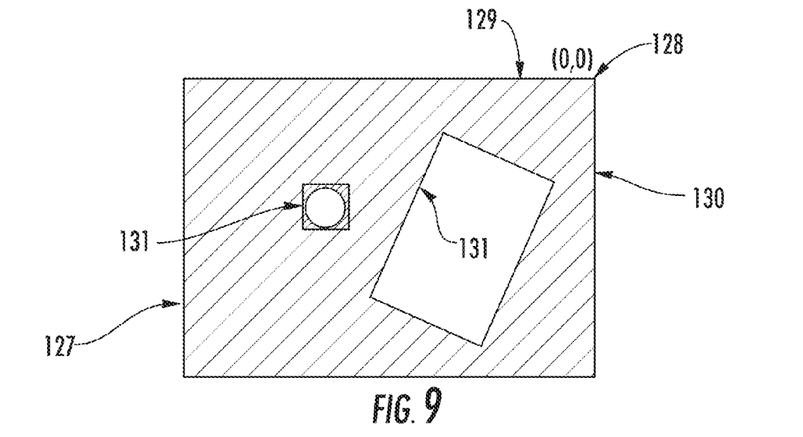
FIG. 9 depicts the silhouette image showing the outline of objects on the platform area assembly, according to embodiments disclosed herein.

FIG. 9 depicts the silhouette image showing the outline of objects on the platform area assembly 103, according to embodiments disclosed herein. As illustrated, a derived mask 127 shows the spatial information of objects 124,125 located on the platform area assembly 103. A point of reference 128 may be designated for the platform area assembly 103 and objects within a captured image can be spatially described by referencing this point of reference 128. A corner of the platform area assembly 103 may be designated as the point of reference 128. For a two dimensional image, the pixel located at the point of reference 128 may have the X,Y coordinates of (0,0). Pixels in the image may have positive X and Y coordinates, which may be referenced relative to the origin. The X reference side 129 intersects at the origin and has the designation (X,0) where X varies from 0 to a maximum number of X pixels. The Y reference side 130 may also intersects at the origin and may have the designation of (0,Y) where Y varies from 0 to the maximum number of Y pixels. The reference sides may be perpendicular to each other and intersect at a reference 128.

When it is determined that the sides of an object within a platform area image are not parallel and perpendicular to the reference sides (X and Y) 129,130, the image may be referred to as out of skew, or skewed. In addition, the objects themselves may not have square sides or have non-rectangular shapes such as the object 124 shown in the front side illuminated image 123.

To correct for out of skew objects, embodiments may utilize logic executed by the local computing device 105 to find a rectangle 131 (such as the smallest rectangle) in which the object can be contained. The rectangle 131 may not contain a side that is substantially parallel with one of the reference sides. The sides of the rectangle 131 may be used to derive a vector from which the exact amount of skew can be calculated. Knowing the angular skew and the X,Y coordinates of pixels contained within the object, the image of the object can be extracted from the front side illuminated image 123 and remapped to a new image that is both parallel and perpendicular to the reference sides. In some embodiments, the reference sides may be digitally aligned to the edges of the area sensor 111.

Figure 10:
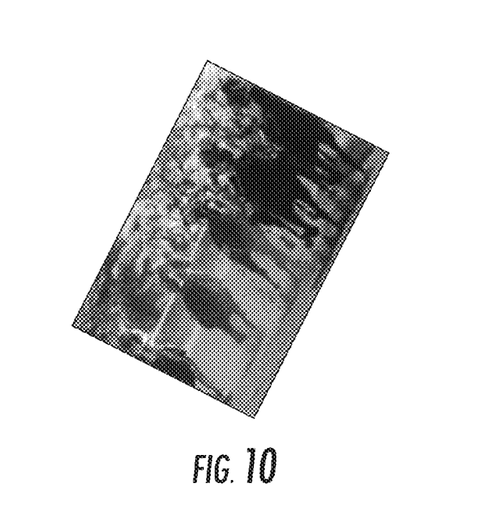
FIG. 10 depicts an image of an extracted object before it is skew corrected, according to embodiments disclosed herein.

FIG. 10 depicts an image of an extracted object before it is skew corrected, according to embodiments disclosed herein. As illustrated, the embodiment of FIG. 10 provides an image that is extracted from the original platform image capture but is not parallel or perpendicular to a reference side.

Figure 11:
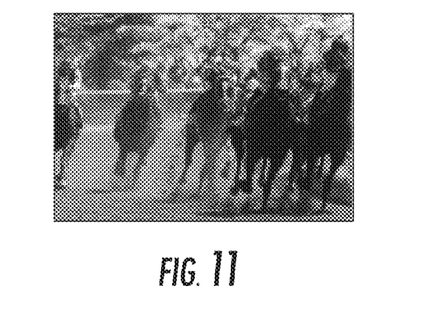
FIG. 11 depicts the same image shown in FIG. 10 after skew correction is applied, according to embodiments disclosed herein.

FIG. 11 depicts the same image shown in FIG. 10 after skew correction is applied, according to embodiments disclosed herein. As illustrated, an image that is extracted and is skew correct may contain information that does not belong to the object of interest.

Figure 12:
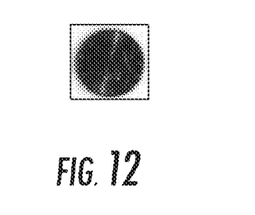
FIG. 12 depicts an image of an extracted object before the background is removed, according to embodiments disclosed herein.

FIG. 12 depicts an image of an extracted object before the background or captured imagery of the exposed area is removed, according to embodiments disclosed herein. As illustrated, an extracted object image may contains at least one pixel that does not belong to the object. Since an object may not be a perfect rectangle, such as the object 125 in FIG. 7, the image may contain information that belongs to the platform area assembly 103. It may be desirable to remove the information that belongs to the platform area assembly 103 and only display the image information that belongs to the object. The local computing device 105 (and/or remote computing device) may be used to map which pixels belong to the object and which belong to the platform area assembly 103. Pixels that are outside of the edges of the object but within the bounds of a best fit rectangle can be replaced and/or modified in the image.

Figure 13:
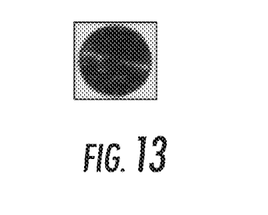
FIG. 13 depicts an image of the extracted object after the background is removed, according to embodiments disclosed herein.

FIG. 13 depicts an image of the extracted object after the background is removed, according to embodiments disclosed herein. As illustrated, a replacement pixel may be a transparent alpha pixel used in image formats such as *.tff and *.png, and/or it can be replaced with a colored pixel that is chosen by the user. FIG. 13 shows the coin image after the background pixels are removed.

Since all objects may not be solid and may have at least one hole or opening, an additional operation may be performed that identifies and maps openings within the object. Holes and openings may be defined as enclosed islands within the object. The pixels within the enclosed islands are replaced with a pixel value such as transparent or a specified color that the user selects. In addition, the transition of pixel values from light to dark is not always abrupt. The area of pixels that transition from light to dark may do so over the distance of several pixels. The point at which the transition occurs can be adjusted to the user's preference by using different threshold values. The amount of light that passes through the object itself can be measured by the intensity of the pixels that belong to the object. The intensity information can then be used to apply different amounts of transparency to designated pixels. Pixel values within an object can vary from fully transparent to opaque. This may result in semi-transparent areas that appear transparent when placed over a background.

Figure 14:
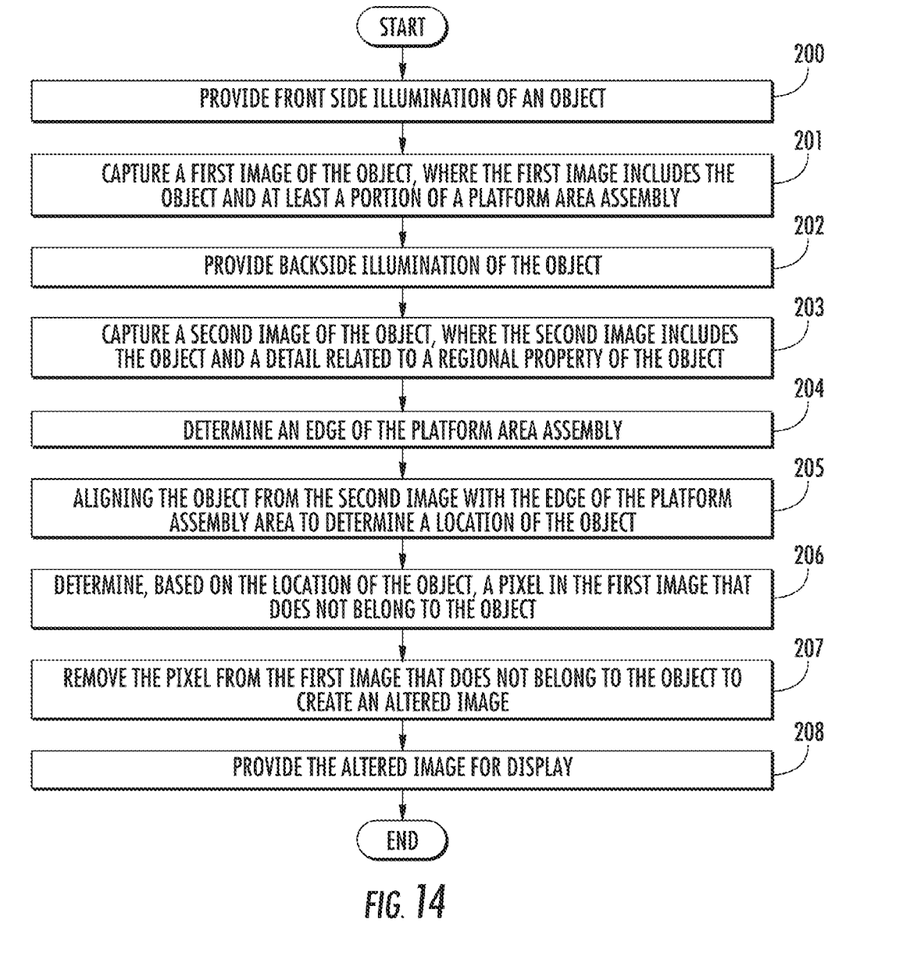
FIG. 14 depicts a flowchart for providing enhanced object detection, according to embodiments described herein.

FIG. 14 depicts a flowchart for providing enhanced object detection, according to embodiments described herein. As illustrated in block 200, front side illumination of an object may be provided. In block 201, a first image of the object may be captured, where the first image includes the object and at least a portion of a platform area assembly 103. In block 202, backside illumination of the object may be provided. In block 203, a second image of the object may be captured while illuminated from the back side, where the second image of the object includes a detail related to a regional property of the object. In block 204, an edge of the platform area assembly 103 may be determined. In block 205, the object from the second image may be aligned with the edge of the platform assembly area to determine a location of the object. In block 206, a determination may be made, based on the location of the object, regarding whether a pixel in the first image that does not belong to the object. In block 207, the pixel from the first image that does not belong to the object may be removed or modified to create an altered image. In block 208, the altered image may be provided for display.

As illustrated above, various embodiments enhanced object detection are disclosed. These embodiments may be configured to accurately remove background from an object scan to provide a more robust and accurate scan of the object.

It should be understood that, while some embodiments utilize a platform surface area that is backlit, some embodiments utilize a light source placed on the same side of the platform as the image capture device, combined with a reflective surface on the platform. This configuration provides a reflection from the platform surface that is measurably different from an object placed on the platform. This approach may include an infrared (IR) light source, and a reflector on the platform that selectively reflects IR light while absorbing visible light. With the benefit of an imaging sensor that is sensitive to IR light, the edges of objects placed on the platform can be discerned, as well as any transmissive properties of the objects. This approach is beneficial esthetically since the IR light is not visible to the operator. Also, the non-reflective nature of the platform to visible light reduces detrimental ambient light effects that may occur in certain user environments. The IR light source may be any of the standard light sources available, with and IR LED in some embodiments. The imaging sensor may be the same device as utilized for the visible spectrum since such devices are also sensitive in the near IR. The reflector may be any mirror that is reflective in the IR; a layer of material that transmits in the IR and absorbs in the visible (such as CYRO's ACRYLITE® IR acrylic 11460—infrared transmitting (IRT) sheet) may be placed over the minor surface to produce a platform surface that appears black to a user but is reflective in the IR.

Other embodiments may utilize a platform that incorporates an array of light sensitive elements, such as photodiodes, combined with a light source on the same side of the platform as the camera. Incorporating a large area array, such as can be fabricated with printable electronics, into the platform and illuminating this detector plane from the same side as the camera produces an associated transmission/absorption profile on the detector plane, resulting in the necessary position information of objects placed on the platform. With the appropriate sensor, IR, UV or visible light may be used for this approach.

It will also be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. The use of "including" "comprising" or "having" and variations thereof herein is meant to encompass the items listed thereafter and equivalents thereof as well as additional items.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the present disclosure may be implemented in software. As such, it should be noted that a plurality of hardware and software-based devices, as well as a plurality of different structural components may be utilized to implement the present disclosure. Furthermore, and as described in subsequent paragraphs, the specific mechanical configurations illustrated in the drawings are intended to exemplify embodiments of the present disclosure and that other alternative mechanical configurations are possible.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for advanced object detection. It should also be understood that these embodiments are merely exemplary and are not intended to limit the scope of this disclosure.

What is claimed is:

1. A method for enhanced object detection, comprising:
providing front side illumination of an object;
capturing, by a computing device, a first image of the object, wherein the first image includes the object and at least a portion of a platform area assembly;
providing, by the computing device, backside illumination of the object;
capturing, by the computing device, a second image of the object, wherein the second image of the object includes a regional property of the object;
determining, by the computing device, an edge of the platform area assembly;
aligning, by the computing device, the object from the second image with the edge of the platform area assembly to determine a location of the object;
determining, by the computing device, based on the location of the object, a pixel in the first image that does not belong to the object;
modifying, by the computing device, the pixel from the first image that does not belong to the object to create an altered image; and
providing, by the computing device, the altered image for display.

2. The method of claim 1, further comprising determining a transparency of the object from the second image.

3. The method of claim 1, wherein the first image includes details regarding the object, including at least one of the following: colors, content, and surfaces of the object.

4. The method of claim 1, wherein capturing the first image includes combining a plurality of digital captures and combining the plurality of digital captures into the first image.

5. The method of claim 4, wherein capturing the first image includes combining six digital captures and combining the six digital captures into the first image.

6. The method of claim 1, further comprising determining whether the object is out of skew and, in response to determining that the object is out of skew correcting orientation of the object.

7. The method of claim 1, further comprising mapping an opening within the object.

8. A system for enhanced object detection, comprising:
a platform area assembly that includes a surface for supporting an object on a front side for scanning;
a light source assembly coupled to the platform area assembly, the light source assembly illuminating the front side of the platform area assembly and the object residing on the platform area assembly;
an image capture device coupled to the light source assembly, the image capture device capturing imagery of the object on the platform area assembly;
a backlight assembly that is coupled to a backside of the platform area assembly, the backlight assembly for illuminating the object through the platform area assembly; and
a computing device coupled to the image capture device, wherein the computing device comprises logic that, when executed by a processor, causes the processor to perform at least the following:
activate the light source assembly to illuminate the object and the platform area assembly;
activate the image capture device to capture a first image of the object and at least a portion of the platform area assembly with the light source assembly activated;
activate the backlight assembly to illumination the object and the platform area assembly from the backside of the platform area assembly;
activate the image capture device to capture a second image of the object and at least a portion the platform area assembly with the backlight assembly activated;
compare the first image and the second image to determine a regional property of the object in the first image; and
remove the captured imagery of the platform area assembly from the first image.

9. The system of claim 8, wherein the light source assembly comprises three dies, wherein a first die directed to a red spectrum, wherein a second die is directed to a green spectrum, and wherein a third die is directed to a blue spectrum for the image capture device to capture a plurality of digital captures.

10. The system of claim 8, wherein the logic further causes the computing device to receive six digital captures from the image capture device for creating the first image.

11. The system of claim 8, wherein the backlight assembly comprises a support plate, a mirrored plate, a light guide, an enhancement film, and a diffuser plate for providing illumination of the platform area assembly and the object such an exposed area of the platform area assembly appears near white and the object on the platform area assembly impedes light from the backlight assembly, resulting in a near black silhouette of the object that is captured by the image capture device.

12. The system of claim 8, wherein the light source assembly provides at least one of the following lighting: Infrared, deep infrared, ultraviolet, red, green, blue, and white.

13. The system of claim 8, wherein the computing device activates the backlight assembly when the light source assembly is deactivated.

14. The system of claim 8, wherein the logic further causes the computing device to determine whether an image is out of skew, and in response to determining that the object is out of skew, correct orientation of the object in the first image.

15. A computing device for enhanced object detection, comprising:

a processor that executes instructions; and a memory component that is coupled to the processor that stores logic that, when executed by the processor, causes the computing device to perform at least the following:

activate a light source assembly of an imaging assembly to illuminate an object and a platform area assembly of the imaging assembly, wherein the imaging assembly comprises an image capture device that captures a first image and a second image of the object and at least a portion of the platform area assembly, the light source assembly that provides front side illumination of the object and the platform area assembly, the platform area assembly that is at least partially translucent, and a backlight assembly that provides back side illumination of the object and the platform area assembly;

activate the image capture device to capture the first image of the object and at least a portion of the platform area assembly with the light source assembly activated and the backlight assembly deactivated;

activate the backlight assembly to illumination the object and the platform area assembly from a backside of the platform area assembly;

deactivate the light source assembly;

activate the image capture device to capture the second image of the object and at least a portion the platform area assembly with the backlight assembly activated and the light source assembly deactivated;

analyze the second image to determine a regional property of the object in the first image; and modify imagery of the platform area assembly from the first image, based on the analysis of the second image.

16. The computing device of claim 15, wherein the computing device is a remote computing device that is separate from the imaging assembly.

17. The computing device of claim 15, wherein the computing device is a local computing device that is an integrated component of the imaging assembly.

18. The computing device of claim 15, wherein the logic further causes the computing device to receive six digital captures from the image capture device for creating the first image.

19. The computing device of claim 15, wherein the logic further causes the computing device to determine whether an image is out of skew, and in response to determining that the object is out of skew, correct orientation of the object in the first image.

20. The computing device of claim 15, wherein the logic further causes the computing device to compare the first image to the second image to determine a perimeter of the object.

* * * * *